Patented Apr. 3, 1945

2,372,947

UNITED STATES PATENT OFFICE 2,372,947

POLYVINYL HALIDE COMPOSITION

Thomas L. Gresham, Akron, Ohio, assignor to The B. F. Goodrich Company, New York, N. Y., a corporation of New York No Drawing. Application February 20, 1941, Serial No. 379,823

10 Claims. (Cl. 260—36)

This invention relates to polyvinyl halide compositions and pertains specifically to plasticizers which produce useful and unusual properties in the compositions in which they are used.

It is well known that the polyvinyl halides, and in particular gamma polyvinyl chloride, or any polymer made largely from vinyl chloride, may be plasticized with various materials, among which are tricresyl phosphate, dibutyl phthalate, butyl phthalyl butyl glycollate, etc. It is important that these materials not only have a high solvent power for polyvinyl halides, but also have a high boiling point and a low viscosity. If the solvent power is low the plasticizing effect of the compound is greatly decreased; the tensile strength of the resulting stock is low and the plasticizer tends to "bleed." If the boiling point of the plasticizer is low the volatility of the compound is appreciable even at room temperature, and at slightly elevated temperatures is much more pronounced, so that the plasticizer gradually disappears and the composition tends to lose its rubber-like qualities.

In general, the boiling point of a compound containing a hydrocarbon chain increases with the number of carbon atoms in the chain; for example, dioctyl phthalate has a much higher boiling point than dibutyl phthalate. However, an increase in the length of the carbon chain decreases the solvent power of the plasticizer for polyvinyl halide. This effect is not confined to any specific compound, but applies to all known polyvinyl halide plasticizers.

I have now discovered a class of plasticizers, comprising the alkyl esters of ortho-benzoyl benzoic acid, in which an increase in the length of the alkyl chain leads to an increase in solvent power of the plasticizer rather than a decrease. So far as is known, the alkyl o-benzoyl benzoates are unique in this respect and it is impossible to duplicate the effect in any other known series. These plasticizers may be made by the method described by Bruson in U. S. Patent 1,909,092 issued May 16, 1933.

As a measure of solvent power I have measured the amount of hexane necessary to produce cloudiness in a 2% solution of gamma polyvinyl chloride in the plasticizer to be tested. For each 100 volumes of solution the following volumes of hexane were required for the respective plasticizers: butyl o-benzoyl benzoate, 67; 2-ethyl hexyl o-benzoyl benzoate, 70; lauryl o-benzoyl benzoate, 150; cetyl o-benzoyl benzoate, 150. The increased amount of hexane required to produce cloudiness in the solutions is very clear evidence of the increased solvent power of the plasticizer when the length of the carbon chain is increased.

The compositions made with my new plasticizers have many uses as rubber substitutes where special properties are required, such as high electrical resistivity, resistance to acids, alkalies, oxidizing agents or oils and greases. The composition may be prepared by any of the usual methods, such as mixing on a hot roll mill or in an internal mixer. Stocks of varying physical properties may be secured, depending upon the proportion of plasticizer used. I prefer to use from one-half to four parts by weight of plasticizer to one of polymer. Pigments and fillers such as clay, barytes, carbon black, whiting, etc., which are in common use in the rubber and plastics industries may be used in my compositions. Any vinyl halide polymer such as alpha, beta, or gamma polyvinyl chloride, polyvinyl bromide, or copolymers of vinyl chloride with minor proportions of vinyl esters such as vinyl acetate or vinyl cyanide, or with vinylidene chloride may be satisfactorily plasticized with my compounds. In order to obtain special properties other plasticizers may also be used in the same composition; stabilizers such as the lead salts of fatty acids or the esters of unsaturated monocarboxylic acids or other materials may be added to give greater stability toward heat and light.

Although I have herein disclosed specific embodiments of my invention, I do not intend to limit myself solely thereto, but only to the spirit and scope of the appended claims.

I claim:

1. A composition of matter comprising a polymer made from a monomeric material consisting substantially of vinyl chloride, and a plasticizer having the formula

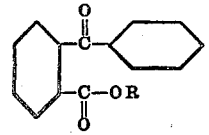

where R is an alkyl group containing more than three carbon atoms.

2. A composition of matter comprising a polymer made from a monomeric material consisting substantially of vinyl chloride, and a plasticizer having the formula

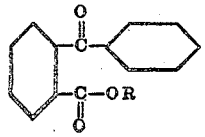

where R is an alkyl group containing from four to sixteen carbon atoms.

3. A composition of matter comprising gamma polyvinyl chloride and a plasticizer having the formula

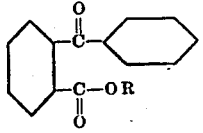

where R is an alkyl group containing more than three carbon atoms.

4. A composition of matter comprising gamma polyvinyl chloride and a plasticizer having the formula

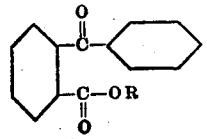

where R is an alkyl group containing from four to sixteen carbon atoms.

5. A composition of matter comprising a polymer made from a monomeric material consisting substantially of vinyl chloride and 2-ethyl hexyl o-benzoyl benzoate.

6. A composition of matter comprising a polymer made from a monomeric material consisting substantially of vinyl chloride and lauryl o-benzoyl benzoate.

7. A composition of matter comprising a polymer made from a monomeric material consisting substantially of vinyl chloride and cetyl o-benzoyl benzoate.

8. A composition of matter comprising gamma polyvinyl chloride and 2-ethyl hexyl o-benzoyl benzoate.

9. A composition of matter comprising gamma polyvinyl chloride and lauryl o-benzoyl benzoate.

10. A composition of matter comprising gamma polyvinyl chloride and cetyl o-benzoyl benzoate.

THOMAS L. GRESHAM.